United States Patent
Wu (10) Patent No.: US 9,772,459 B2
(45) Date of Patent: Sep. 26, 2017

(54) OPTOELECTRONIC MODULE AND METHOD OF PRODUCING SAME

(71) Applicant: CYNTEC CO., LTD., Hsinchu (TW)

(72) Inventor: Ming-Che Wu, Nantou (TW)

(73) Assignee: CYNTEC CO., LTD., Hsinchu (TW)

( * ) Notice: Subject to any disclaimer, the term of this patent is extended or adjusted under 35 U.S.C. 154(b) by 0 days.

(21) Appl. No.: 14/970,231

(22) Filed: Dec. 15, 2015

(65) Prior Publication Data
US 2017/0052336 A1    Feb. 23, 2017

(30) Foreign Application Priority Data

Aug. 19, 2015  (TW) .................................. 104126981

(51) Int. Cl.
*G02B 6/12*    (2006.01)
*G02B 6/42*    (2006.01)

(52) U.S. Cl.
CPC ........... *G02B 6/4245* (2013.01); *G02B 6/423* (2013.01); *G02B 6/428* (2013.01); *G02B 6/4246* (2013.01)

(58) Field of Classification Search
CPC .... G02B 6/4245; G02B 6/426; G02B 6/3636; G02B 6/3648; G02B 6/4232; G02B 6/4239; G02B 6/4238; G02B 6/4244
See application file for complete search history.

(56) References Cited

U.S. PATENT DOCUMENTS

| | | | | |
|---|---|---|---|---|
| 4,809,358 A | * | 2/1989 | Fernstrom | H04B 10/803 385/14 |
| 5,283,446 A | * | 2/1994 | Tanisawa | G02B 6/42 257/433 |
| 5,478,778 A | * | 12/1995 | Tanisawa | G02B 6/42 228/180.22 |
| 5,963,429 A | * | 10/1999 | Chen | H01L 25/0652 257/686 |
| 6,069,027 A | * | 5/2000 | Mertol | H01L 21/50 257/E21.499 |

(Continued)

FOREIGN PATENT DOCUMENTS

| | | |
|---|---|---|
| JP | 2007517388 A | 6/2007 |
| TW | 201339683 A | 10/2013 |
| TW | 201401583 A | 1/2014 |

*Primary Examiner* — Rhonda Peace
(74) *Attorney, Agent, or Firm* — Kirton McConkie; Evan R. Witt (57) ABSTRACT

An optoelectronic module includes an interposer base having first and second recesses formed on a specified surface thereof; a joint material layer filled in the first and second recesses; a first optoelectronic element placed in the first recess and coupled to the interposer base via the joint material layer, wherein an optical signal is emitted from or passes through a lateral surface of the first optoelectronic element; and a second optoelectronic element placed in the second recess and coupled to the interposer base via the joint material layer, wherein a lateral surface of the second optoelectronic element faces the lateral surface of the first optoelectronic element for coupling to and receiving the optical signal emitted from or passing through the lateral surface of the first optoelectronic element. A fixture is used to place the first and second optoelectronic elements into the first and second recesses while controlling some critical distances.

6 Claims, 11 Drawing Sheets

(56) References Cited

U.S. PATENT DOCUMENTS

| | | | | |
|---|---|---|---|---|
| 6,266,251 B1* | 7/2001 | Bassi | | H01L 23/13 |
| | | | | 174/255 |
| 6,617,677 B2* | 9/2003 | Steffens | | H01L 23/057 |
| | | | | 257/684 |
| 6,775,440 B2* | 8/2004 | Kishida | | G02B 6/42 |
| | | | | 385/147 |
| 6,956,999 B2* | 10/2005 | Case | | G02B 6/3873 |
| | | | | 356/153 |
| 7,088,074 B2* | 8/2006 | Clevenger | | H01L 23/58 |
| | | | | 257/690 |
| 7,195,941 B2* | 3/2007 | Lu | | G02B 6/423 |
| | | | | 257/E21.123 |
| 7,901,146 B2* | 3/2011 | Yoshikawa | | G02B 6/423 |
| | | | | 385/14 |
| 8,873,903 B2* | 10/2014 | Wessel | | G11B 5/105 |
| | | | | 360/234.3 |
| 9,235,011 B2* | 1/2016 | Takano | | G02B 6/42 |
| 2002/0037137 A1 | 3/2002 | Wu et al. | | |
| 2006/0002443 A1* | 1/2006 | Farber | | H01S 5/141 |
| | | | | 372/50.1 |
| 2007/0228502 A1* | 10/2007 | Minamio | | H01L 27/14618 |
| | | | | 257/431 |
| 2008/0008477 A1* | 1/2008 | Ogawa | | G02B 6/43 |
| | | | | 398/164 |
| 2012/0241795 A1 | 9/2012 | Chang et al. | | |
| 2013/0163916 A1* | 6/2013 | Kim | | G02B 6/4232 |
| | | | | 385/14 |
| 2013/0228362 A1* | 9/2013 | Berkel | | H01L 23/36 |
| | | | | 174/252 |
| 2014/0147075 A1* | 5/2014 | Wessel | | G11B 5/105 |
| | | | | 385/14 |
| 2014/0192832 A1 | 7/2014 | Shih et al. | | |
| 2016/0011386 A1* | 1/2016 | Kossat | | G02B 6/4239 |
| | | | | 385/14 |
| 2016/0343635 A1* | 11/2016 | Rae | | H01L 23/3157 |
| 2017/0052336 A1* | 2/2017 | Wu | | G02B 6/43 |

* cited by examiner

OPTOELECTRONIC MODULE AND METHOD OF PRODUCING SAME

FIELD OF THE INVENTION

The present invention relates to a method of producing an optoelectronic module, and more particularly to a method of producing an optoelectronic module involving a optoelectronic alignment process. The present invention also relates to an optoelectronic module, and more particularly to an optoelectronic module produced by a method of producing an optoelectronic module involving an optoelectronic alignment process.

BACKGROUND OF THE INVENTION

Due to the rapid development of internet and mobile communication technologies, the need for transmitting big data is getting higher and higher. The transmission speed by way of electronic signals seems to have reached a bottle neck. Therefore, the requirement on new transmission means is increasing. For example, the use of optical signals in data transmission paths as an artery would become a trend in the near future. Please refer to FIG. 1, in which a conventional optical transceiver is schematically shown. In the optical transceiver 1, an equalization module 11 functions for diminishing attenuation and jitters of an electronic signal. The electronic signal is then converted into optical signals carrying a large amount of data by an optical transmitter 12, which includes a laser driver 120, a laser light source 121, a monitor photodiode (MPD) 122, and an automatic gain controller (AGC) 123. The optical signal is transmitted to an optical receiver 14 via an optical fiber 13. The optical receiver 14 mainly include an optical detector 141, a trans-impedance amplifier (TIA) 142, a clock and data recovery (CDR) circuit 143 and a pre-emphasis circuit 144 for converting the received optical signal into a corresponding electronic signal, and then outputting the corresponding electronic signal.

Figure 1:
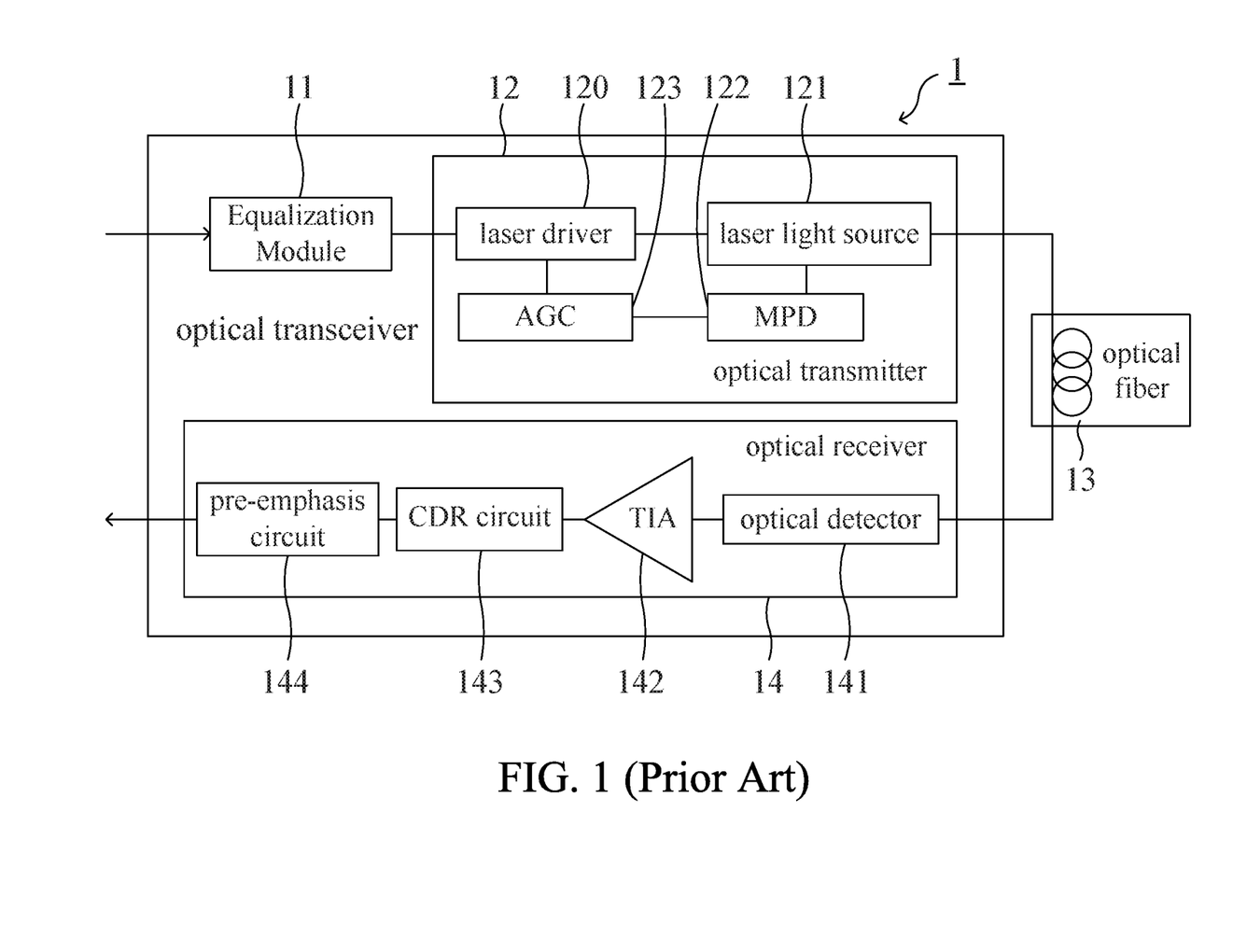
FIG. 1 is a schematic circuit block diagram of a conventional optical transceiver.
Figure 2:
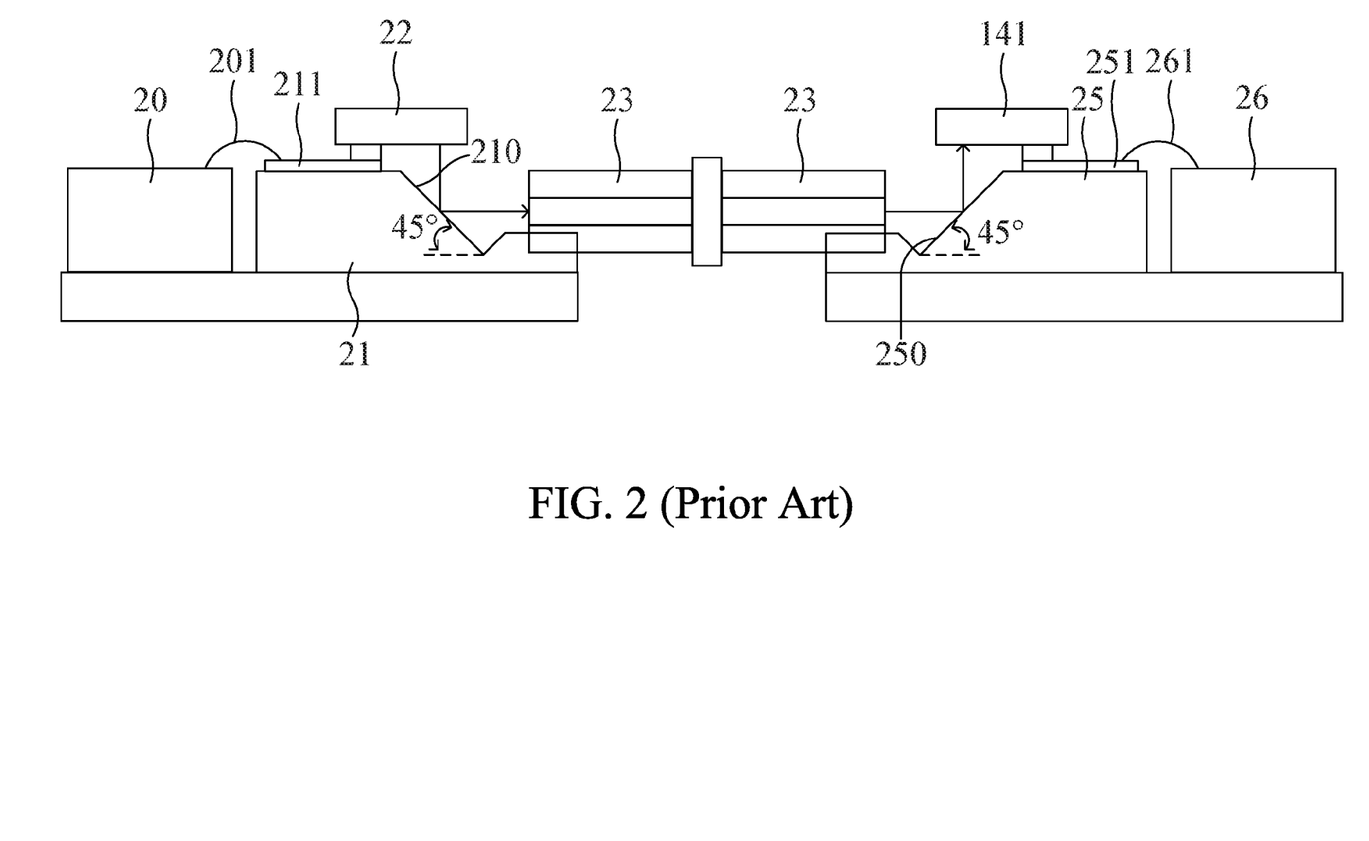
FIG. 2 is a structural diagram schematically illustrating an active optical cable (AOC) formed on the basis of a silicon optical bench (SiOB)

Please refer to FIG. 2, in which the structure of an active optical cable (AOC) formed on the basis of a silicon optical bench (SiOB) is schematically shown. An integrated circuit (IC) chip 120 is formed with the equalization module 11 and other associated circuitry, e.g. the laser driver 120, the monitor photodiode 122 and the automatic gain controller 123, and functions for outputting the electronic signals carrying the data to a laser light generator 22 via an external metal wire 201 and a transmission line 211 of a silicon optical bench 21, thereby generating the optical signal. The laser light generator 22 may be implemented with the laser light source 121 as shown in FIG. 1, e.g a vertical cavity surface emitting laser (VCSEL). The laser light signal generated by the laser light generator 22 implemented with the vertical cavity surface emitting laser is injected onto a 45-degree reflective surface 210 of the silicon optical bench 21, reflected to an optical fiber 23, and then transmitted to another silicon optical bench 25. By way of a 45-degree reflective surface 250 of the silicon optical bench 25, the optical signal is inputted into the optical detector 141. In general, the trans-impedance amplifier 142, the clock and data recovery circuit 143 and the pre-emphasis circuit 144 are formed on an integrated circuit (IC) chip 26. Through an external metal line 261 and a transmission line 251 of the silicon optical bench 25, the IC chip 26 is electrically connected to the transmission line 251 of the SiOB 25.

When the transmission speed is required to be higher and higher in order to meet commercial needs, for example expected to increase from 10 Gbps to 40~100 Gbps, the vertical cavity surface emitting laser technique would not be a good choice any more due to high cost of elements such as the laser light source 121 and the laser driver 120, and technical problems. Instead, a complementary metal-oxide-semiconductor (CMOS) photonics platform is used. The CMOS photonics platform allows most of the elements included in the optical transceiver 1 as shown in FIG. 1 to be formed on the same silicon substrate by way of a CMOS manufacturing process. In this technique, the laser driver 120 and the laser light source 121 are replaced with a Mach-Zehnder interferometer (MZI) as shown in FIG. 3.

Figure 3:
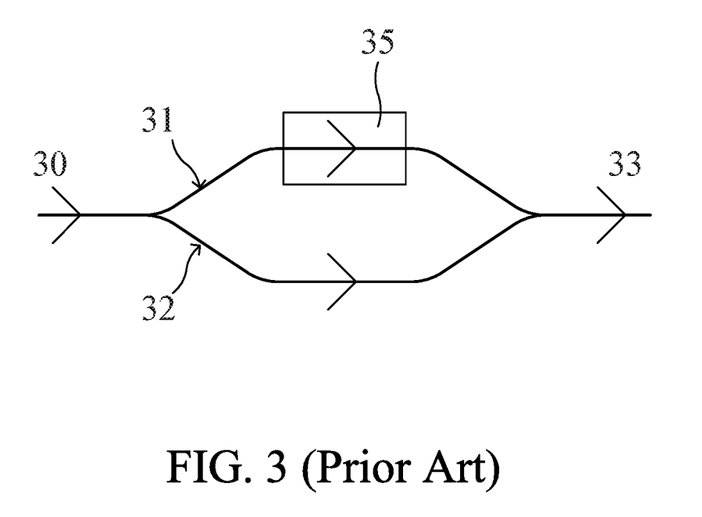
FIG. 3 is a scheme illustrating the function of a typical Mach-Zehnder interferometer.

It can be seen from FIG. 3 that in a typical Mach-Zehnder interferometer, an input waveguide 30 is divided into an upper waveguide 31 and a lower waveguide 32. With no voltage applied, light is coupled to form an output waveguide 33, and meanwhile, an "ON" signal is generated. Once a proper voltage is applied to a phase retarder 35, the voltage changes the refraction index of the waveguide so that in the path of the upper waveguide 31, light is retarded with half a wavelength, or 180-degree phase. Accordingly, the energy of light in the two optical paths become offset so as to generate an "OFF" signal. Therefore, by controlling the operation of the phase retarder 35, the laser light source which continuously emits laser light can exhibit "ON" and "OFF" effects without directly control the power of the laser light source. Consequently, circuitry complexity can be largely reduced and transmission speed can be significantly enhanced.

Figure 4:
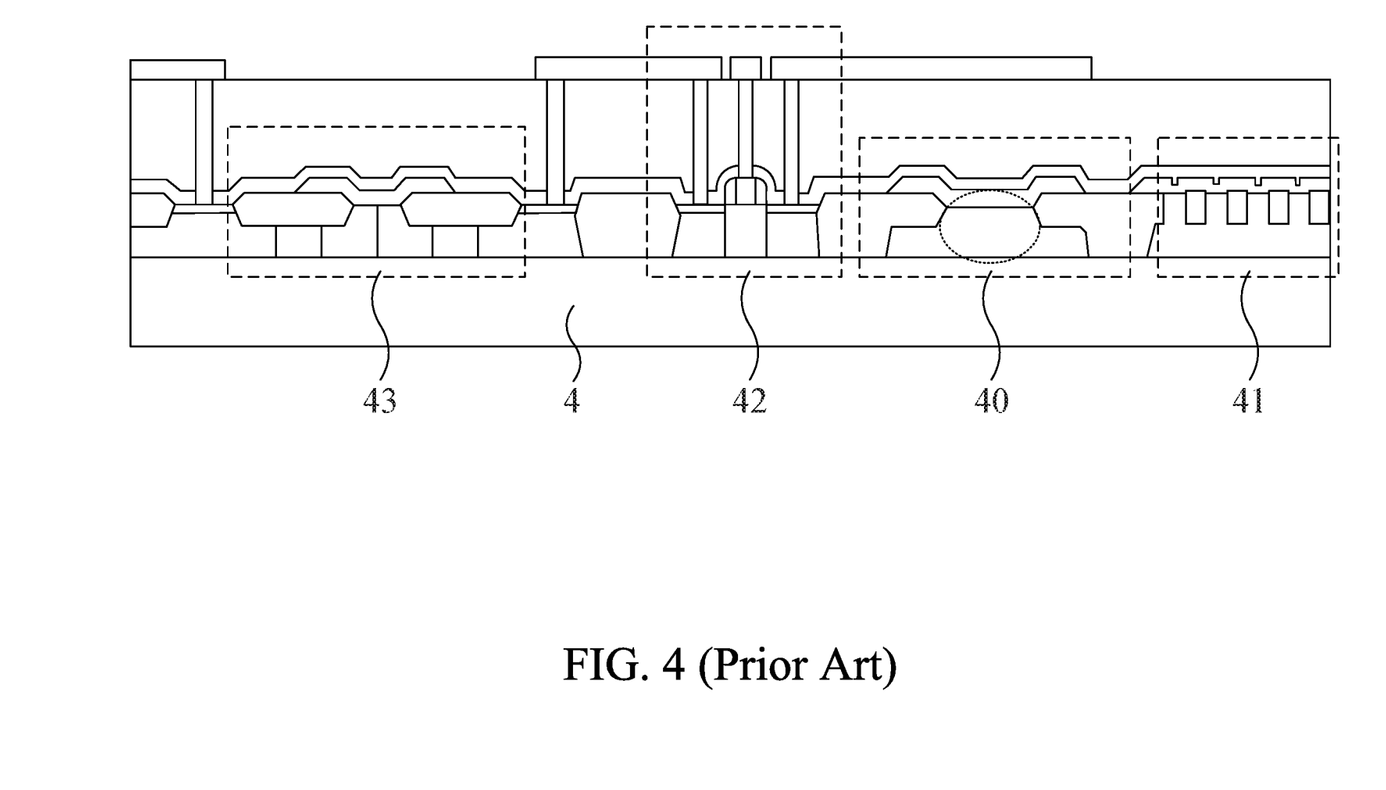
FIG. 4 is a schematic cross-sectional view of a conventional CMOS photonics platform.

As shown in FIG. 4, a cross-sectional view of a CMOS photonics platform is schematically shown. A waveguide structure 40, a grating structure 41, a transistor structure 42 and a modulator structure 43 are formed on a silicon substrate 4. The waveguide structure 40 includes a variety of elements, e.g. a light input nanotaper, light splitter, light filter, light coupler, and light output nanotaper, functioning for receiving the external laser light and transmitting the modulated optical signal to the external optical fiber (not shown). The grating structure 41 mainly functions as a Bragg grating. The transistor structure 42 functions as a phase shifter and a waveguide detector. The modulator structure 43 functions as the MZI modulator as shown in FIG. 3.

Figure 5:
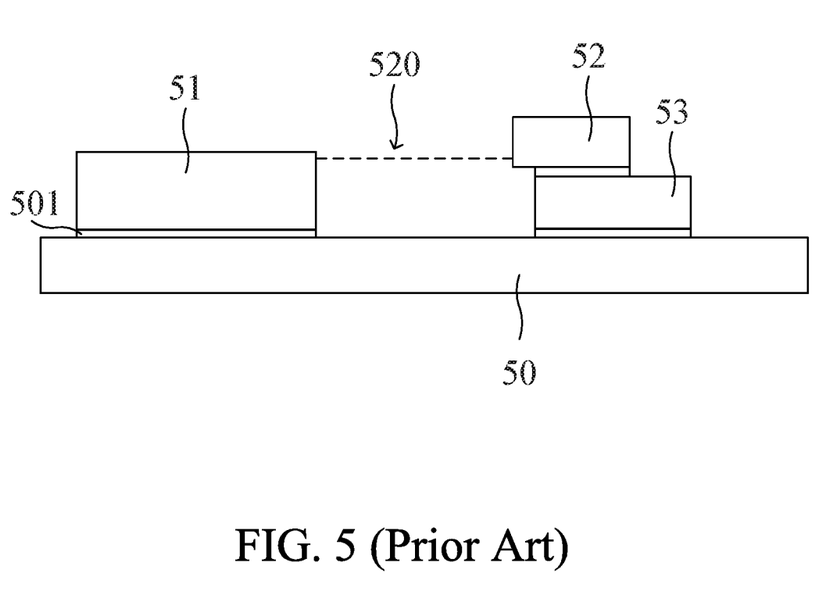
FIG. 5 is a schematic diagram illustrating the packaging of a CMOS photonics platform and an edge emitting laser source via an interposer according to prior art.

Please refer to FIG. 5, in which the packaging of a CMOS photonics platform 51 and an edge emitting laser source 52 via an interposer 50 according to prior art is schematically illustrated. The edge emitting laser source 52 is disposed on a submount 53, and configured in a manner that the light outlet of the edge emitting laser source 52 disposed outside is at a level consistent to the level of the light output end of the optical waveguide structure (not shown in this figure) of the CMOS photonics platform 51. Since the optical signal 520 emitted from the edge emitting laser source 52 is diffracted by a slit, and then passes a collimator, an isolator and a condenser lens (not shown) to couple to the optical waveguide structure of the CMOS photonics platform 51, the condenser lens is adjusted by way of active alignment. When aligning and assembling operations are performed, the edge emitting laser source 52 has to keep operating to generate the optical signal 520. Meanwhile, the coupling effect needs to be detected in real time by way of image processing. Then feedback control is performed to locate optimal assembling position, where the light coupling effect of the optical signal to the waveguide structure 40 as shown in FIG. 4 is optimized. Acceptable deviation in the active alignment process is about +/−4 μm in each of the three axes. Shift deviation beyond the acceptable range would make the optical signal unable to couple to the waveguide structure 40 with a satisfactory light coupling efficiency. In the prior art, it is relatively easy to control the shift deviation in the X-axis and the Y-axis, but the shift deviation in the Z-axis, i.e. in the height dimension, is hard to be controlled. Therefore, the optoelectronic device needs current transmitting therethrough for operations. In addition, the assembling equipment needs additional power supply and detecting circuit, which renders high cost and complicated assembling. The relatively long assembling time is disadvantageous to batch production. Furthermore, assembling deviation might be even worse due to imprecise thickness of the solder layer 501 between the interposer 50 and the CMOS photonics platform 51, as well as imprecise thickness of the interposer 50 and the CMOS photonics platform 51 themselves. Moreover, the thickness of the edge emitting laser source 52 and the submount might also be imprecise, and thus the overall deviation might exceed +/−4 µm.

SUMMARY OF THE INVENTION

Therefore, the present invention provides an optoelectronic module, which exhibits improved assembling precision and promoted yield rate compared with the prior art.

The present invention provides an optoelectronic module, which comprises an interposer base having a first recess and a second recess, both formed on a specified surface thereof; a joint material layer filled in the first recess and the second recess; a first optoelectronic element placed in the first recess and coupled to the interposer base via the joint material layer, wherein an optical signal is emitted from or passes through a lateral surface of the first optoelectronic element; and a second optoelectronic element placed in the second recess and coupled to the interposer base via the joint material layer, wherein a lateral surface of the second optoelectronic element faces the lateral surface of the first optoelectronic element for coupling to and receiving the optical signal emitted from or passing through the lateral surface of the first optoelectronic element.

The present invention further provides a method of producing an optoelectronic module, which comprises: providing an interposer base having a first recess and a second recess, both formed on a specified surface thereof; filling a joint material layer in the first recess and the second recess; placing a first optoelectronic element in the first recess to be coupled to the interposer base via the joint material layer, wherein an optical signal is emitted from or passes through a first align point at a lateral surface of the first optoelectronic element, and a distance from the first align point to a top surface of the first optoelectronic element is a first length; and placing a second optoelectronic element in the second recess to be coupled to the interposer base via the joint material layer, wherein a second align point at a lateral surface of the second optoelectronic element faces the lateral surface of the first optoelectronic element, and a distance from the second align point to a top surface of the second optoelectronic element is a second length, wherein a horizontal height of the first align point of the first optoelectronic element is substantially at the same level as a horizontal height of the second align point of the second optoelectronic element for the second optoelectronic element to couple to and receive the optical signal from the first optoelectronic element.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 6A:
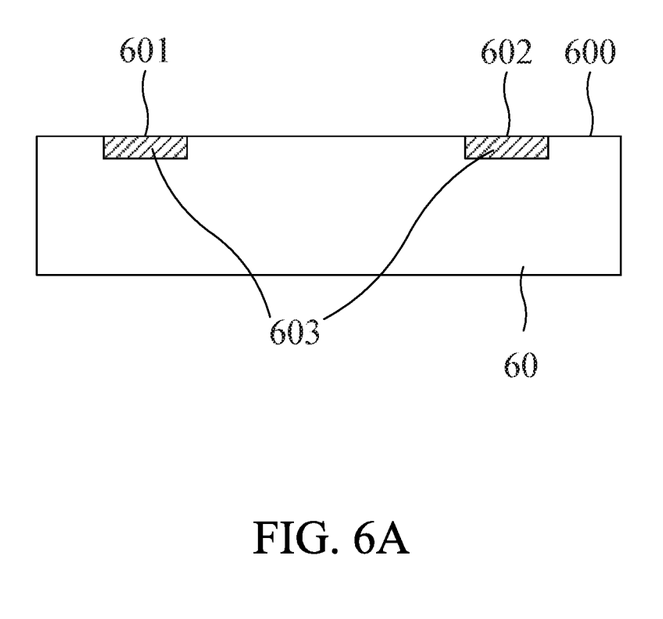
FIGS. 6A-6C are schemes illustrating steps for producing an optoelectronic module according to an embodiment of the present invention.
Figure 6B:
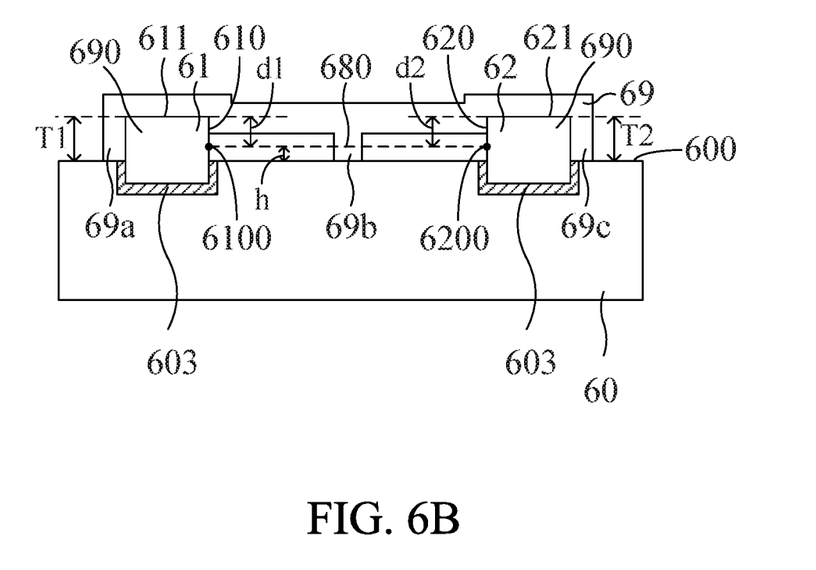
Figure 6C:
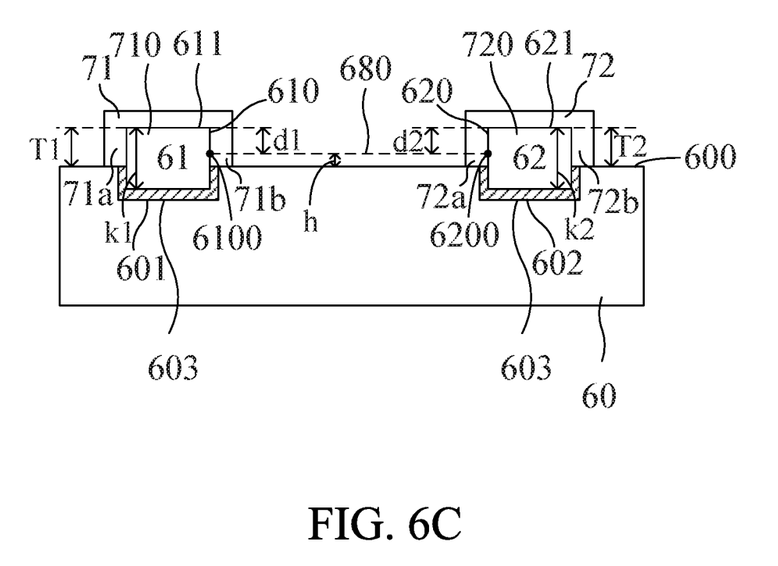

Please refer to FIGS. 6A-6C, in which a method of producing an optoelectronic module according to an embodiment of the present invention is shown. As shown in FIG. 6A, an interposer base 60 is provided, and a recess structure is formed thereon. The recess structure includes at least a first recess 601 and a second recess 602 formed on the same surface 600 of the interposer base 60. A joint material layer 603 is filled in the recess structure. The cross sections of the first recess 601 and the second recess 602 may have a shape independently selected from a rectangle, U-shape or V-shape. The interposer base 60 may be common silicon interposer base or any other suitable interposer base for packaging a chip. The material of the interposer base 60, for example, may be glass or ceramic. The joint material layer 603 is desirably formed of a suitable material so as to make the thickness of the layer 603 variable with pressure, e.g. the pressure resulting from installation of an optoelectronic element. In a specific example, a soft joint material such as alloy soldering material, silver glue, epoxy, non-conductive adhesive, or UV-cured adhesive, which is deformable with pressure before curing, may be used. More specifically, the alloy soldering material may be selected from tin/gold alloy, tin/silver/copper alloy, tin/silver alloy, copper/tin alloy, lead/tin alloy, gold/tin alloy, tin/cobalt alloy, tin/bismuth alloy, tin/zinc alloy, tin/nickel alloy, aluminum/tin alloy or any other suitable alloy. It is understood that metallic joint material is advantageous in good heat dissipation effect to keep the temperature of the optoelectronic element low. Since the first recess 601 and the second recess 602 can be created by way of a semiconductor manufacturing process, e.g. defined and etched by way of a microlithographic process, high precision can be achieved so as to enhance the light coupling effect of the final product.

Referring to FIG. 6B, a first optoelectronic element 61 is placed into the first recess 601 and coupled to the interposer base 60 via the joint material layer 603. The second optoelectronic element 62 is placed into the second recess 602 and coupled to the interposer base 60 via the joint material layer 603. An optical signal 680 is emitted from or passes through a light outlet 6100 at a lateral surface 610 of the first optoelectronic element 61. The second optoelectronic element 62 has a light inlet 6200 at a lateral surface 620 thereof. The lateral surface 620 of the second optoelectronic element 62 is disposed opposite to the lateral surface 610 of the first optoelectronic element 61 with the light inlet 6200 aligned with the light outlet 6100 so that the optical signal 680 from the first optoelectronic element 61 can be received by the second optoelectronic element 62. It is preferred that the first optoelectronic element 61 and the second optoelectronic element 62 have the same thickness. Nevertheless, even if the thickness of the first optoelectronic element 61 and the thickness of the second optoelectronic element 62 are not exactly the same, a high-precision optoelectronic module can still be produced according to the present invention as long as the thickness difference between the first optoelectronic element 61 and the second optoelectronic element 62 is less than the depth of the first recess 601 or the second recess 602, and a first length d1 from the light outlet 6100 to the top surface 611 of the first optoelectronic element 61 is substantially consistent with a second length d2 from the light inlet 6200 to the top surface 621 of the second optoelectronic element 62. Accordingly, a first distance T1 from the surface 600 of the interposer base 60 to the top surface 611 of the first optoelectronic element 61 can be equal to a second distance T2 from the surface 600 of the interposer base 60 to the top surface 621 of the second optoelectronic element 62, thereby assuring of well horizontal alignment of the light outlet 6100 of the first optoelectronic element 61 with the light inlet 6200 of the second optoelectronic element 62. In this way, automatic passive alignment can be achieved to accomplish high coupling efficiency of the optical signal 680 between the first optoelectronic element 61 and the second optoelectronic element 62.

The first optoelectronic element 61 and the second optoelectronic element 62 exhibit functions of processing optoelectronic signals. For example, they process conversion between an electronic signal and an optical signal, and/or modulation, focusing, splitting, guiding, collimating, filtering and/or coupling of an optical signal. An example of an element for converting an electronic signal into an optical signal is a light-emissive optoelectronic element such as a laser diode or a light emitting diode (LED), which includes surface emitting and edge emitting types. An example of an element for converting an optical signal into an electronic signal is a photodetecting optoelectronic element, i.e. a photodetector, which may be a semiconductor-based photo diode such as a p-n junction diode, a p-i-n diode, or a avalanche photo diode. In addition, a metal-semiconductor-metal (MSM) photodetector or a photoconductor whose resistance is changeable under illumination may also be used as the photodetecting optoelectronic element.

The functions of modulating, focusing, splitting, guiding, collimating, filtering and/or coupling the optical signal can be performed by, for example, a photonics IC, a condenser lens, an optical splitter, an optical waveguide structure, an optical isolator, an optical collimator, and/or an optical fiber connector, etc. An optoelectronic device or an optoelectronic module commonly exhibits both light transmission and light receiving functions for transmitting and receiving data-carrying optical signals, and generally, the light transmission function is likely to suffer from poor alignment between associated optoelectronic elements. For example, light emitted by a laser diode is transmitted sequentially through a lens-type optical collimator for collimating the scattering light, an optical isolator for filtering light, a condenser lens for focusing light, and then a photonics IC for modulating and splitting light in order to generate multiple optical signals carrying a large quantity of data, i.e. multiple channels. At last, the multiple optical signals carrying the large quantity of data are transmitted and coupled to an optical fiber outside the optoelectronic module via an optical fiber connector. The present invention can be applied to alignment of each of the optoelectronic elements, particularly the photonics IC and the light emissive optoelectronic element. In the following embodiments, the first optoelectronic element 61 is a light emissive optoelectronic element, and the second optoelectronic element 62 is a photonics IC. The resulting optoelectronic module according to the present invention has better optical waveguide efficiency and/or light coupling efficiency.

For this purpose, in an embodiment of the present invention, a fixture 69 as shown in FIG. 6B is used. The fixture 69 has a hollow chamber 690 for accommodating therein the first optoelectronic element 61 or the second optoelectronic element 62. When the fixture 69 is used to place the first optoelectronic element 61 into the first recess 601, the fixture 69 urges the first optoelectronic element 61 against the joint material layer 603, and the joint material layer 603 deforms until at least one of the bottom structures 69a, 69b and 69c, e.g. the exterior bottom structure 69a and 69c, contacts with the surface 600 of the interposer base 60. In this way, a distance between an inner surface of the fixture 69 in contact with the top surface 611 of the first optoelectronic element 61 disposed inside the hollow chamber 690 and the surface 600 of the interposer base 60, i.e. the first distance T1, can be kept constant. Likewise, a distance between an inner surface of the fixture 69 in contact with the top surface 621 of the second optoelectronic element 62 disposed inside the hollow chamber 690 and the surface 600 of the interposer base 60, i.e. the first distance T2, can also be kept constant, and equal to the first distance T1. The fixture 69 engages with or disengages from the first optoelectronic element 61 or the second optoelectronic element 62 by way of a vacuum attraction technique. A vacuum attraction technique is only an example, and any other suitable technique may be adopted for the engagement and disengagement of elements. An electromagnetic attraction technique is one of the alternative examples. In the above-described embodiment, possible deviation between elements can be offset by the thickness change of the joint material layer 603. In other words, when the first optoelectronic element 61 is placed into the first recess 601 and the second optoelectronic element 62 is placed into the second recess 602, a reflow, snap cure or UV cure process can be performed to adjust the thickness of the joint material layer 603 so as to accomplish height adjustment and readily positioning.

Alternatively, two separate fixtures can be used to conduct the packaging operation, as shown in FIG. 6C. As shown, a first fixture 71 is used for mounting the first optoelectronic element 61 into the first recess 601 and a second fixture 72 is used for mounting the second optoelectronic element 62 into the second recess 602. The first fixture 71 has a hollow chamber 710 for accommodating therein the first optoelectronic element 61. When the fixture 71 is used to place the first optoelectronic element 61 into the first recess 601, the fixture 71 urges the first optoelectronic element 61 against the joint material layer 603, and the joint material layer 603 deforms until at least one of the bottom structures 71a and 71b contacts with the surface 600 of the interposer base 60. In this way, a distance between an inner surface of the first fixture 71 in contact with the top surface 611 of the first optoelectronic element 61 disposed inside the hollow chamber 710 and the surface 600 of the interposer base 60, i.e. the first distance T1, can be kept constant. Likewise, the second fixture 72 has a hollow chamber 720 for accommodating therein the second optoelectronic element 62. When the second fixture 72 is used to place the second optoelectronic element 62 into the second recess 602, the second fixture 72 urges the second optoelectronic element 62 against the joint material layer 603, and the joint material layer 603 deforms until at least one of the bottom structures 72a and 72b contacts with the surface 600 of the interposer base 60. In this way, a distance between an inner surface of the second fixture 72 in contact with the top surface 621 of the second optoelectronic element 62 disposed inside the hollow chamber 720 and the surface 600 of the interposer base 60, i.e. the second distance T2, can be kept constant.

In this embodiment, if a first length d1 from the light outlet 6100 of the first optoelectronic element 61, i.e. a first align point for optical signal, to the top surface 611 of the first optoelectronic element 61 is consistent to a second length d2 from the light inlet 6200 of the second optoelectronic element 62, i.e. a second align point for optical signal, to the top surface 621 of the second optoelectronic element 62, i.e. d1=d2, the first distance T1 would be inherently equal to the second distance T2. The difference between them is substantially zero. Unfortunately, the thickness K1 of the first optoelectronic element 61 is sometimes unequal to the thickness K2 of the second optoelectronic element 62, so the first length d1 might be different from the second length d2. Nevertheless, by accurately controlling the depth of the first hollow chamber 710 and the depth of the second hollow chamber 720 to have a difference between the first distance T1 and the second distance T2 substantially equal to the difference between the first length d1 and the second length d2 according to the present invention, the relative positions of the first align point and the second align point for optical signal can still be kept horizontally consistent. Accordingly, the optical signal 680 emitted from or passing through the first optoelectronic element 61 can be coupled to the second optoelectronic element 602 with satisfactory optical wave conducting rate and optical coupling efficiency. The first optoelectronic element 61 may be a common edge emitting laser source, and the light emitted by the edge emitting laser source is diffracted via a slit, and then passes a collimator, an isolator and a condenser lens to tune a light output angle. The second optoelectronic element 62 may be a MOS photonics platform, and the light inlet 6200 is an optical waveguide structure of the MOS photonics platform.

Figure 7A:
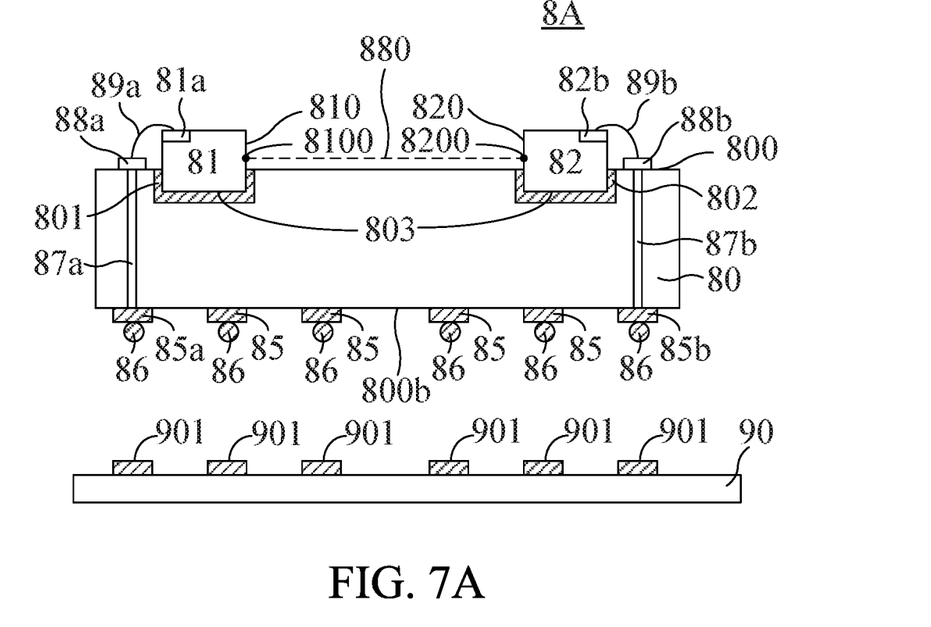
FIG. 7A and FIG. 7B are schematic cross-sectional views illustrating two examples of the structure of an optoelectronic module according to an embodiment of the present invention.

An optoelectronic module produced by either of the above two embodiments is schematically shown in FIG. 7A. The optoelectronic module 8A includes an interposer base 80, and a recess structure is formed on the interposer base 80. The recess structure includes at least a first recess 801 and a second recess 802 formed on the same surface 800 of the interposer base 80. A joint material layer 803 is filled into the first recess 801 and the second recess 802. The first optoelectronic element 81 is placed into the first recess 601 and coupled to the interposer base 80 via the joint material layer 803. The second optoelectronic element 82 is placed into the second recess 802 and coupled to the interposer base 80 via the joint material layer 803. An optical signal 880 is emitted from or passes through a light outlet 8100 at a lateral surface 810 of the first optoelectronic element 81. The second optoelectronic element 82 has a light inlet 8200 at a lateral surface 820 thereof. The lateral surface 820 of the second optoelectronic element 82 is disposed opposite to the lateral surface 810 of the first optoelectronic element 81 with the light inlet 8200 aligned with the light outlet 8100 so that the optical signal 880 from the first optoelectronic element 81 can be received by the second optoelectronic element 82. For example, the first optoelectronic element 81 may be an optoelectronic element functioning as an optical signal emitter, e.g. the above-described edge emitting laser source, and the second optoelectronic element 82 may be an optoelectronic element functioning as an optical signal receiver, e.g. the above-described MOS photonics platform. The optical signal 880 emitted from or passing through the first optoelectronic element 81 is parallel to the upper surface 800 of the interposer base 80. In a specific example, the joint material layer 803 may be made of alloy soldering material, silver glue, epoxy, non-conductive adhesive, or UV-cured adhesive, which is deformable to adjust thickness thereof with the aid of a fixture before being cured by way of a reflow, snap cure or UV cure process. The cured joint material layer 803 in different recesses may have different thickness as long as the light outlet 8100 is well aligned with the light inlet 8200 in the packaged final product for effective optical wave conduction and efficient light coupling.

In this embodiment, the optoelectronic module 8A further includes a plurality of module pins 85a, 85b and 85, pads 88a and 88b, metal lines 89a and 89b, and solder balls 86. The interposer base 80 has interlayer structures 87a and 87b with through silicon vias (TSV). The interlayer structures 87a and 87b are electrically connected between the module pins 85, 85a and 85b on the lower surface 800b and the pads 88a and 88b on the upper surface 800. The solder balls 86 may be soldering material such as tin, tin/silver or tin/coper alloy. A ball placement process may be performed after an aligning and compressing process to attach the solder balls 86 onto the lower surface of each module pins 85. Furthermore, a wire bonding process may be performed to have the metal wires 89a and 89b electrically connected between the pads 88a and 88b of the interposer base 80 and the pins 81a and 82b of the optoelectronic elements 81 and 82. The electronic signals of the optoelectronic elements 81 and 82 can thus be transmitted to the interposer base 80, elements disposed on the interposer base 80 (not shown) and/or the module pins 85a, 85b and 85 through the metal lines 89a and 89b. When the optoelectronic module 8A is welded to a system PCB board 90, the module pins 85 on the lower surface of the optoelectronic module would be electrically coupled to a corresponding pad 901 of the system PCB board 90.

Figure 7B:
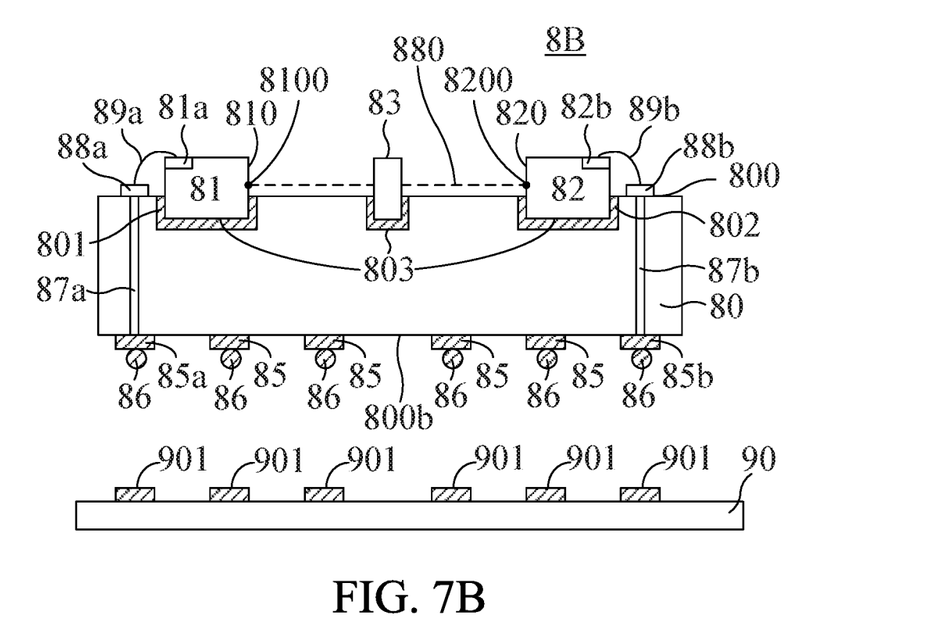

FIG. 7B schematically illustrates another example of optoelectronic module similar to that shown in FIG. 7A. In this example, an optoelectronic module 8B is similar to the optoelectronic module 8A except further comprising a third optoelectronic element 83, e.g. a collimator, wherein the optical signals through the optoelectronic element 81 and the optoelectronic element 82 will pass the third optoelectronic element 83. The disposition and alignment of the third optoelectronic element 83 is similar to the optoelectronic elements 81 and 82.

Figure 8:
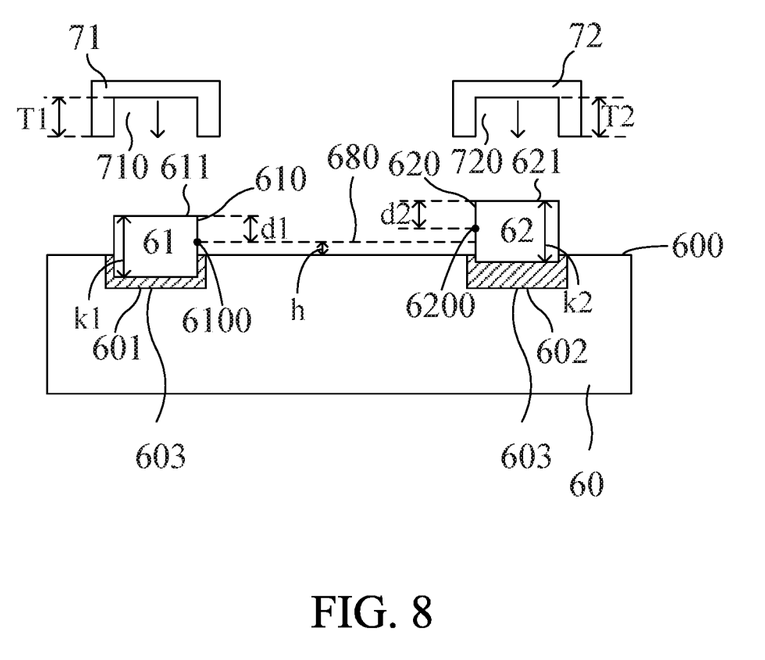
FIG. 8 is a schematic diagram illustrating a method of producing an optoelectronic module according to another embodiment of the present invention.

Please refer to FIG. 8, which schematically illustrates a method of producing an optoelectronic module according to another embodiment of the present invention. In this embodiment, which is different from the embodiment shown in FIG. 6C, the first optoelectronic element 61 and the second optoelectronic element 62 are first placed into the first recess 601 and the second recess 602. Then the first fixture 71 is used to press the first optoelectronic element 61 against the joint material layer 603. Likewise, the second fixture 72 is used to press the second optoelectronic element 62 against the joint material layer 603. The joint material layer 603 in the first recess 601 and the joint material layer 603 in the second recess 602 deform to respectively required levels to well align the light outlet 6100 and the light inlet 6200.

Figure 9:
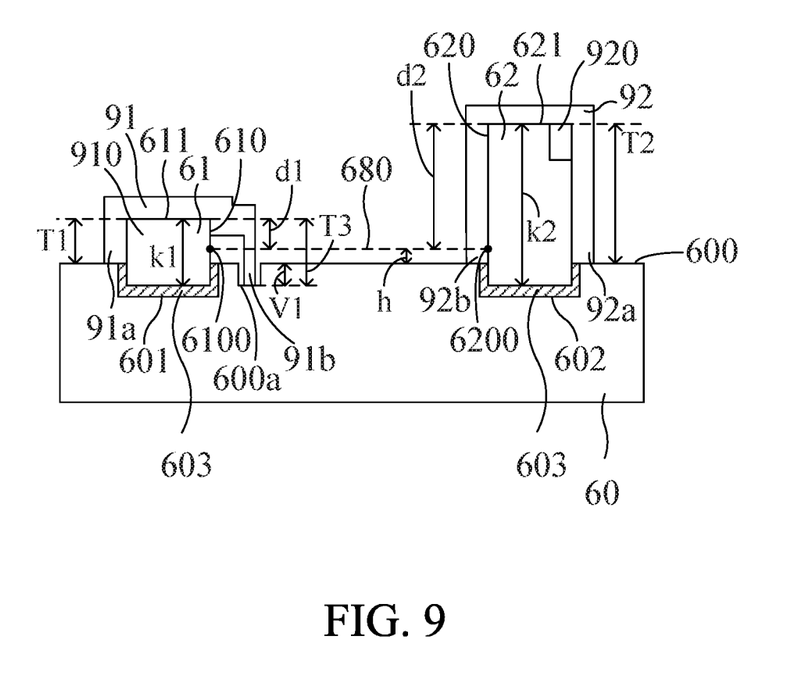
FIG. 9 is a schematic diagram illustrating a method of producing an optoelectronic module according to a further embodiment of the present invention.

FIG. 9 schematically illustrates a method of producing an optoelectronic module according to a further embodiment of the present invention. If the thickness K1 of the first optoelectronic element 61 is different from the thickness K2 of the second optoelectronic element 62, the first length d1 will be unequal to the second length d2. Therefore, in this embodiment, two fixtures of different thickness are used, e.g. the first fixture 91 and the second fixture 92. Furthermore, the length of two bottom structures may be the same, e.g. the bottom structures 92a and 92b of the second fixture 92, or different, e.g. the bottom structures 91a and 91b of the first fixture 91. For accommodating the longer bottom structure 91b, the interposer base 60 in this embodiment has a fixture trench 600a with a depth V1. Therefore, the first distance T1(T1=d1+h) of the first fixture 91, the second distance T2(T2=d2+h) of the second fixture 92 and the third distance T3(T3=d1+h+V1) of the first fixture 91, as shown in FIG. 9, are all different. Nevertheless, as long as the equation h=T1−d1=T2−d2=T3−d1−V1 is complied with, wherein T1−d1, T2−d2, and T3−d1−V1 all define a common height h, the light outlet 6100 and the light inlet 6200 can still be well aligned with the height h (horizontal height). Therefore, the optical signal 680 emitted from or passing through the first optoelectronic element 61 can be coupled to the second optoelectronic element 602 with satisfactory optical wave conducting rate and optical coupling efficiency.

As described above, the deviation problems encountered in the prior art can be largely ameliorated by the present invention. In practice, the alignment deviation between the height of the light outlet and the height of the light inlet of the optoelectronic module according to the present invention can be controlled to be less than 1.4 micrometers, which is significantly improved compared with the 2.24~5.4 micrometer deviation of the prior art. In addition, the assembling time can be improved from 1~2 minutes to about 10 seconds.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of producing an optoelectronic module, comprising:
providing an interposer base having a first recess and a second recess, both formed on a specified surface thereof;
filling a deformable joint material layer in the first recess and the second recess;
using a fixture to press a first optoelectronic element against the joint material layer in the first recess to couple the first optoelectronic element to the interposer base via the joint material layer, wherein an optical signal is emitted from or passes through a first align point at a lateral surface of the first optoelectronic element; and
using a fixture to press a second optoelectronic element in the second recess to couple the second optoelectronic element to the interposer base via the joint material layer, wherein a second align point at a lateral surface of the second optoelectronic element faces the lateral surface of the first optoelectronic element,
wherein a horizontal height of the first align point of the first optoelectronic element above the specified surface of the interposer base is substantially at a same level as a horizontal height of the second align point of the second optoelectronic element above the specified surface of the interposer base for the second optoelectronic element to couple to and receive the optical signal from the first optoelectronic element;
wherein a top surface of the first optoelectronic element is pressed with a first fixture to be placed into the first recess until the first fixture urges against the interposer base, and a top surface of the second optoelectronic element is pressed with a second fixture to be placed into the second recess until the second fixture urges against the interposer base, wherein the first fixture has a first hollow chamber for accommodating the first optoelectronic element, and the second fixture has a second hollow chamber for accommodating the second optoelectronic element; and
wherein a difference between a first distance, which is defined as a distance from an inner surface of the first fixture in contact with the top surface of the first optoelectronic element to the specified surface of the interposer base, and a second distance, which is defined as a distance from the inner surface of the second fixture in contact with the top surface of the second optoelectronic element to the specified surface of the interposer base, is substantially equal to a difference between a first length, which is defined as a distance from the first align point to a top surface of the first optoelectronic element and a second length, which is defined as a distance from the second align point to a top surface of the second optoelectronic element.

2. The method according to claim 1, further comprising a reflow or curing process of the joint material layer after the horizontal height of the first align point and the horizontal height of the second align point are adjusted to be at substantially the same level.

3. The method according to claim 1, wherein the interposer base is a silicon interposer base, and the joint material layer is formed of a material selected from a group consisting of an alloy soldering material, a silver glue, epoxy, a non-conductive adhesive and a UV-cured adhesive.

4. A method of producing an optoelectronic module, comprising:
providing an interposer base having a first recess and a second recess, both formed on a specified surface thereof;
filling a deformable joint material layer in the first recess and the second recess;
using a fixture to press a first optoelectronic element against the joint material layer in the first recess to couple the first optoelectronic element to the interposer base via the joint material layer, wherein an optical signal is emitted from or passes through a first align point at a lateral surface of the first optoelectronic element; and using a fixture to press a second optoelectronic element in the second recess to couple the second optoelectronic element to the interposer base via the joint material layer, wherein a second align point at a lateral surface of the second optoelectronic element faces the lateral surface of the first optoelectronic element, wherein a horizontal height of the first align point of the first optoelectronic element above the specified surface of the interposer base is substantially at a same level as a horizontal height of the second align point of the second optoelectronic element above the specified surface of the interposer base for the second optoelectronic element to couple to and receive the optical signal from the first optoelectronic element; and wherein the same fixture is used for pressing the first and second optoelectronic elements, which has a first hollow chamber for accommodating the first optoelectronic element, and a second hollow chamber for accommodating the second optoelectronic element.

5. The method according to claim 4, wherein the fixture has an inner surface urging against a top surface of the first optoelectronic element in the first hollow and an inner surface urging against a top surface of the second optoelectronic element in the second hollow while having another surface urging against the specified surface of the interposer base.

6. A method of producing an optoelectronic module, comprising:

providing an interposer base having a first recess and a second recess, both formed on a specified surface thereof;

filling a deformable joint material layer in the first recess and the second recess;

using a fixture to press a first optoelectronic element against the joint material layer in the first recess to couple the first optoelectronic element to the interposer base via the joint material layer, wherein an optical signal is emitted from or passes through a first align point at a lateral surface of the first optoelectronic element; and using a fixture to press a second optoelectronic element in the second recess to couple the second optoelectronic element to the interposer base via the joint material layer, wherein a second align point at a lateral surface of the second optoelectronic element faces the lateral surface of the first optoelectronic element, wherein a horizontal height of the first align point of the first optoelectronic element above the specified surface of the interposer base is substantially at a same level as a horizontal height of the second align point of the second optoelectronic element above the specified surface of the interposer base for the second optoelectronic element to couple to and receive the optical signal from the first optoelectronic element;

wherein a top surface of the first optoelectronic element is pressed with a first fixture to be placed into the first recess until the first fixture urges against the interposer base, and a top surface of the second optoelectronic element is pressed with a second fixture to be placed into the second recess until the second fixture urges against the interposer base, wherein the first fixture has a first hollow chamber for accommodating the first optoelectronic element, and the second fixture has a second hollow chamber for accommodating the second optoelectronic element; and wherein the interposer base includes a fixture trench on the specified surface for receiving a partial structure of at least one of the first fixture and the second fixture, and a difference between a first distance, which is defined as a distance from an inner surface of the first fixture in contact with the top surface of the first optoelectronic element to the specified surface of the interposer base, and a second distance, which is defined as a distance from the inner surface of the second fixture in contact with the top surface of the second optoelectronic element to the specified surface of the interposer base, is substantially equal to a difference a first length, which is defined as a distance from the first align point to a top surface of the first optoelectronic element and a second length, which is defined as a distance from the second align point to a top surface of the second optoelectronic element, plus a depth of the fixture trench.

* * * * *